United States Patent Office 3,470,098
Patented Sept. 30, 1969

3,470,098
SULFUR AND CHLORINE CONTAINING ASHLESS DISPERSANT, AND LUBRICATING OIL CONTAINING SAME
Rosemary O'Halloran, Union, N.J., assignor to Esso Research and Engineering Company, a corporation of Delaware
No Drawing. Continuation-in-part of application Ser. No. 422,036, Dec. 29, 1964. This application May 29, 1968, Ser. No. 732,876
Int. Cl. C10m *1/38;* C10l *1/24;* C08f *27/06*
U.S. Cl. 252—47.5                                    8 Claims

ABSTRACT OF THE DISCLOSURE

This invention relates to products formed by reacting ashless dispersants which are mineral-oil soluble carboxylic (or corresponding acid anhydride) amides and imides of polyalkylene amines, with sulfur chloride, method of preparing said products, and oil compositions containing said products.

REFERENCE TO RELATED APPLICATIONS

This application is a continuation-in-part of Ser. No. 422,036, filed Dec. 29, 1964, entitled "Sulfur Containing Ashless Dispersant," now U.S. Patent No. 3,390,086.

PRIOR ART

Recently, certain high molecular weight nitrogen-containing amide and imide derivatives of various carboxylic acids and carboxylic acid anhydrides have become known as ashless sludge dispersants for lubricating oils, fuel oils, gasolines, etc. While effective as sludge dispersants at moderate temperatures, many of these dispersants have poor stability at elevated temperatures and break down to form sludge and deposits. In the case of many lubricating oil compositions formulated for high temperature use, these dispersants have not been as effective as desired. It has now been found that certain of these dispersants can be improved in their thermal stability by reaction with sulfur halides capable of incorporating sulfur onto the dispersant molecule. By so treating these dispersants, they can be effectively used in many high temperature applications such as automatic transmission oils, high temperature diesel oils, aircraft oils, gas engine oils, etc. In addition, the incorporation of sulfur and chlorine generally imparts load-carrying ability to the dispersant.

SUMMARY OF THE INVENTION

The dispersants which are sulfurized with sulfur chloride according to the invention are the mineral-oil-soluble carboxylic acid (or corresponding acid anhydride) amides and imides of polyalkyleneamines, wherein the amide or imide linkages are formed with primary amine groups of said polyalkyleneamines, and wherein said polyalkyleneamines have available secondary amine groups for sulfurization by reaction with the sulfur chloride.

The sulfurized dispersants of the invention can be generally represented by the following word formula:

Acid₁—Polyalkyleneamine—Acid₂ or Aldehyde or Ketone (Sulfur Chloride)$_x$ wherein the first terminal primary amine group of the polyalkyleneamine is reacted with Acid₁, which can be either an acid or an acid anhydride, to convert said primary amino group into the corresponding amide or imide, wherein the second terminal primary amine group of the polyalkyleneamine is reacted with Acid₂ which can be the same as Acid₁, or it can be a fatty acid, or the second terminal primary amine group can be reacted with C₁ to C₁₀ Aldehyde or Ketone to thereby form a Schiff's base. As indicated by the above word formula, the Sulfur Chloride is reacted with a secondary amine group of the polyalkyleneamine, and $x$ can be from 1 up to the number of secondary amine groups available. In some cases, some of the Acid₁, or Acid₂, or Aldehyde or Ketone may also be on a secondary amine group of the polyalkyleneamine. For example, if three moles of Acid₁ are reacted with one mole of the polyalkyleneamine, there will be Acid₁ groups reacted on both the primary amine groups and also reacted on one of the secondary amine groups. Subsequent reaction with the Sulfur Chloride will react the Sulfur Chloride with other secondary amine groups.

Acid₁ includes alkenylsuccinic anhydride, alkenylsuccinic acid, and alkenyl monocarboxylic acid having the structure: alkenyl —CH₂CH₂—COOH. The alkenyl group in these structures contains about 40 to 250, preferably 70 to 120, carbon atoms. Because of its ready availability and low cost, the alkenyl portion of the molecules is preferably a polymer of a C₂ to C₅ monoolefin, said polymer generally having a molecular weight of about 700 to 3000, e.g., about 700 to 1,300. A particularly preferred example of such an olefin polymer is polyisobutylene.

The polyalkyleneamines include those of the general formula:

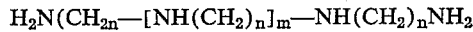

$$H_2N(CH_{2n}—[NH(CH_2)_n]_m—NH(CH_2)_nNH_2$$

wherein $n$ is preferably 2 or 3 and $m$ is 1 to 10. Examples of such polyalkyleneamines include diethylene triamine, tetraethylene pentamine, octaethylene nonamine, tetrapropylene pentamine, etc.

Acid₂ is selected from the group consisting of Acid₁, and carboxylic acid of 1 to 30, preferably 1 to 18, carbon atoms in an aliphatic hydrocarbon chain, which can be branched or straight chain, saturated or unsaturated, and including monocarboxylic acids and dicarboxylic acids. Examples of such acids include acetic acid, fumaric acid, capric acid, adipic acid, lauric acid, oleic acid, linoleic acid, etc.

Aldehydes and Ketones mentioned above will contain from 1 to 10 carbon atoms and consist only of C, H and O. Examples of such aldehydes and ketones include formaldehyde, propionaldehyde, butyraldehyde, n-valeraldehyde, caproaldehyde, isobutyraldehyde, heptaldehyde, benzaldehyde, cinnamaldehyde, actone, methylethyl ketone, and acetophenone.

Examples of the Sulfur Chloride include SCl₂, S₂Cl₂, S₃Cl₄ and SCl₄.

The sulfurized dispersants of the invention are prepared in several ways. Since the primary amine groups are more reactive than the secondary amine groups, the polyalkyleneamine can be first reacted with Acid₁, then reacted with Acid₂ or Aldehyde or Ketone, and finally reacted with the Sulfur Chloride, or the polyalkyleneamine can be simultaneously reacted with a mixture of Acid₁ and Acid₂, or a mixture of Acid₁ and Aldehyde, or a mixture of Acid₁ and Ketone, to react the primary amine groups, after which the polyalkyleneamine is reacted with the Sulfur Chloride, or Acid₂ or Aldehyde or Ketone can be first reacted with the polyalkyleneamine, then Acid₁ is reacted with the polyalkyleneamine, followed by reaction with the Sulfur Chloride.

The preceding reactions of the polyalkyleneamine with Acid₁ and Acid₂ are condensation reactions and are carried out by simply heating (e.g. to about 200–350° F.) the reactants and removing the water of condensation. This water can be readily removed by blowing nitrogen through the reaction mixture during the course of the reaction which will usually be complete in about 1 to 30 hours.

The reaction of the Aldehyde or Ketone with polyalkyleneamine, or with Acid$_1$-polyalkyleneamine material, is also carried out by heating the reactants to about 200° to 500° F. for about 1 to 10 hours in order to remove water of condensation and form a Schiff's base.

During the reaction of the primary amine groups, an inert diluent such as mineral lubricating oil can be mixed with the reactants in order to reduce the viscosity of the reaction mixture and promote better contacting of the reactants with each other.

The above-described dispersants are known in the art and have been described in various patents such as U.S. 3,154,560; 3,172,892; 3,216,936, etc.

Once the primary amine groups of the polyalkyleneamine have been converted to amide, imide, or Schiff's base groups, then the secondary amine groups are sulfurized. The sulfurization reaction is carried out by simply heating the dispersant, usually dissolved in mineral oil, and the Sulfur Chloride sulfurizing agent at a temperature of about 200° to 400° F. for about 0.25 to 10 hours. Usually, the amount of sulfur incorporated in the final product will be about 0.1 to 5 wt. percent, preferably 0.5 to 4 wt. percent, based on the weight of sulfurized dispersant per se.

Following are some specific examples of dispersants.

Dispersant A

This dispersant was of the type: Polyisobutenylsuccinic anhydride — Tetraethylenepentamine — Polyisobutenylsuccinic anhydride, wherein the alkenyl group is from polyisobutylene of about 1,200 molecular weight and the compound is prepared by heating two molar proportions of said polyisobutylene with about one molar proportion of tetraethylenepentamine to give a dispersant believed to have the structure:

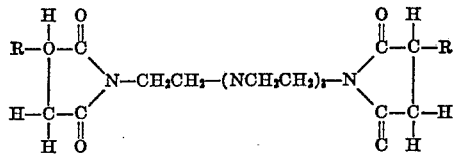

wherein R is the polyisobutenyl group.

As seen by the above structure, the two terminal primary groups of the tetraethylenepentamine (the polyalkyleneamine) have been converted into imide structures by reaction with polyisobutenylsuccinic anhydride (Acid$_1$). Remaining are secondary amine groups, and it is these groups which it is believed are acted upon by the sulfurizing agent.

Dispersant B

A dispersant of the type:

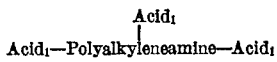

was prepared using 3 molar proportions of Acid$_1$, per molar proportion of polyalkyleneamine.

Acid$_1$ was polyisobutenyl propionic acid, a typical preparation of which follows: A solution was first prepared consisting of 2,000 grams of polyisobutylene of about 950 molecular weight dissolved in 1,000 grams of carbon tetrachloride. Chlorine gas was bubbled through the stirred solution at ambient temperatures (77° F.) for a period of four hours in order to chlorinate the polyisobutylene.

Following the chlorination step, the carbon tetrachloride solvent was removed from the mixture by purging with nitrogen at 285° F. The chlorinated polyisobutylene had a chlorine content of 4.33%.

A mixture of 600 grams of the chlorinated polyisobutylene thus prepared and 55 grams of acrylic acid was heated to 450° F. over a period of 18 hours. Hydrogen chloride was evolved from the mixture during this heating. The mixture was then purged with nitrogen for one-half hour at 450° F., after which the mixture was cooled to 250° F. and filtered through Dicalite (diatomaceous earth) filter aid. The product, identified as polyisobutenyl propionic acid, contained 0.3 wt. percent of chlorine and had a saponification number of 52.1 mg. KOH/gm.

A mixture of 355 grams of the polyisobutenyl propionic acid, 132 grams of a mineral lubricating oil (150 SUS viscosity at 100° F.) and 44 grams of tetraethylenepentamine was heated with stirring to 300° F. for 5 hours, during which time the mixture was continuously purged with nitrogen to remove water formed during the condensation of the acid and the polyamine. The product of the reaction was filtered through Dicalite and was found to contain 2.63% nitrogen and consisted of a mineral lubricating oil solution of Dispersant B.

Dispersant C

A dispersant of the type:

was prepared by condensation of three moles of polyisobutenylsuccinic anhydride with one mole of a commercial tetraethylenepentamine. The polyisobutenyl group had a molecular weight of about 960.

The invention will be further understood by reference to the following examples, which include a preferred embodiment of the invention.

EXAMPLE I 900 grams of an oil solution of Dispersant A (30 wt. percent mineral lubricating oil and 70 wt. percent Dispersant A) was heated with 100 grams of S$_2$Cl$_2$ for about one hour at 300° F. with N$_2$ blowing. At the end of this time, the resulting product was cooled and filtered. The product analyzed 4.79 wt. percent sulfur and 2.15 wt. percent chlorine.

2.5 wt. percent of the product of Example I was added to 97.5 wt. percent of a crankcase motor oil. This oil was a 10W–30 grade crankcase motor oil consisting of neutral distillate mineral lubricating oil, containing a pour depressant additive, a 100,000 mol. wt. polyisobutylene V.I. improving additive, and a P$_2$S$_5$ treated alpha-pinene as an antioxidant additive.

The resulting oil composition was then a fully formulated automotive crankcase oil containing the product of Example I. This oil composition was tested for oxidation in a Laboratory Multiple Oxidation Test (LMOT). In this test, a 40 gram sample of the auto crankcase oil was used. 2.4 grams of iron filings, a 19" piece of No. 14 gauge copper wire and a sanded aluminum strip (12" x ¼" x 1/16") were added as catalysts to the oil composition. Then 10 liters per hour of air was bubbled through the sample maintained at 300° F. At the end of 120 hours, the oil was evaluated for sludge by placing a drop on a blotter and visually examining the paper for sludge. Also, the aluminum strip is examined for varnish deposits, and the neutralization number (ASTM–D–974) of the used, i.e., oxidized, oil is determined.

In addition to the LMOT test, the samples were also tested for copper strip corrosion (ASTM–D–130) by color rating a copper strip after 3 hours immersion of said copper strip in the oil sample at 210° F.

A steel corrosion test was carried out by immersing a quarter section of a copper-lead bearing with a steel backing into a 200 gram oil sample containing 0.625 wt. percent PbO, which sample was maintained at 300° F. for 5 days. The test piece was washed off and placed in a wet atmosphere for 7 days, then visually rated for rust.

For further comparison, a sample of 2.5 wt. percent (based on the total weight of the sample being tested) of the aforesaid oil solution of Dispersant A, which had not been sulfurized, was similarly tested in said crankcase oil.

The compositions tested and the results obtained are summarized in the following Table I.

TABLE I

| Crankcase oil+2.5 wt. percent of product Example I | Sulfurizing agent | LMOT, used oil | | Varnish | ASTM-D-130 Cu strip, 3 hr./210° F. | Steel corrosion |
|---|---|---|---|---|---|---|
| | | Neut. No. | Sludge | | | |
| Unsulfurized dispersant A | $S_2Cl_2$ | 4.3 | None | 0 | | Light. |
| | 0 | 11.4 | V. heavy | 0 | Slight tarnish | |

As seen by Table I, the Dispersant A additive sulfurized with the $S_2Cl_2$ gave no sludge in the LMOT Test. The unsulfurized Dispersant A gave very heavy sludge deposits in the same test.

EXAMPLE II

Part A 95.5 grams of an oil solution consisting of about 50 wt. percent of Dispersant B in about 50 wt. percent of a light lubricating oil, was added to a four-neck flask equipped with a thermometer, a condenser, a dropping funnel and a stirrer. This oil solution was heated to 121° C. and then a slight addition (about 20 drops) of $SCl_2$ was slowly made while trying to avoid reflux. The temperature was then lowered to about 100° C. to avoid reflux, and $SCl_2$ was added over about a one-hour period until a total of 4.5 grams of $SCl_2$ had been added. Next, the temperature was raised to 121° C. and the composition was blown with nitrogen for 45 minutes with the condenser removed in order to eliminate volatiles.

Part B

Part A above was repeated exactly except that 95.5 grams of an oil solution containing about 50 wt. percent Dispersant C in about 50 wt. percent of light mineral oil was used in place of the 95.5 grams of the oil solution of Dispersant B.

EXAMPLE III

Part A 3 wt. percent of $S_2Cl_2$ was added to 97 wt. percent of the aforedescribed 50/50 oil solution of Dispersant B in a flask at about 100° C. over a one-hour period and then blown for 45 minutes with nitrogen, following the general procedure of Example II, Part A.

Part B

Part A, immediately preceding, was repeated but using the aforedescribed 50/50 oil solution of Dispersant C in place of the 50/50 oil solution of Dispersant B.

COMPARISON 1

Part A 500 grams of the aforedescribed 50/50 oil solution of Dispersant B was added to said four-neck flask and 5 grams of $CS_2$ was added, followed by stirring for one-half hour at room temperature. Then heat was applied and the temperature was raised to 280° F. over about a one-hour period. The condenser was removed and the contents and the flask were then blown with nitrogen for about one-half hour at the 280° F. temperature. The contents were then cooled to room temperature.

Part B

Comparison 1, Part A was repeated by using the 50/50 oil solution of Dispersant C in place of the 50/50 oil solution of Dispersant B.

COMPARISON 2

Part A 120 grams of $P_2S_5$ was added over a two-hour period to 880 grams of the aforedescribed 50/50 oil solution of Dispersant B while at a temperature of about 150° C. At the end of this time, the reaction mixture was filtered at 150° C. and then allowed to cool.

Part B

Comparison 2, Part A, immediately preceding, was repeated using 880 grams of the aforesaid 50/50 oil solution of Dispersant C in place of the 880 grams of 50/50 oil solution of Dispersant B.

4 wt. percent of each of the reaction products of the preceding preparation were blended with 96 wt. percent of a mineral lubricating oil having a viscosity of 150 SUS at 100° F. The resulting blends were tested for wear in a Falex machine operating under a 500 pound load for 30 minutes and a 4-ball machine operating at 1,800 p.p.m. under a 10 kg. load for 10 minutes at 150° C. The blends were tested for load carrying ability in an SAE machine operating at 1,000 r.p.m. and a 3.4/1 ratio. Some of the blends were also tested for temperature stability by heating the blends for 23 hours at 340° F. and then measuring the increase in SUS viscosity at 210° F.

For comparison, oil containing the unsulfurized dispersants were also subjected to these tests.

The compositions of the preceding runs and their test results are summarized in Table II, which follows.

TABLE II.—ASHLESS DISPERSANTS SULFURIZED WITH SULFUR CHLORIDE

| Run | Sulfurizing agent | Dispersant | Analysis, wt. percent | | | | Blends, 4 wt. percent in oil | | | |
|---|---|---|---|---|---|---|---|---|---|---|
| | | | S | Cl | P | N | Falex, mg. wear | 4-Ball, mg. wear | SAE, scale pounds | Stability visc. at 210° F., inc. percent |
| II: | | | | | | | | | | |
| A | $SCl_2$ | B | 1.68 | 1.50 | | 1.27 | 4.6 | 0.349 | 341 | |
| B | $SCl_2$ | C | 1.42 | 1.29 | | 1.27 | 0.4 | 0.333 | 156 | 67 |
| III: | | | | | | | | | | |
| A | $S_2Cl_2$ | B | 1.07 | 1.48 | | 1.28 | 6.2 | 0.333 | 117 | |
| B | $S_2Cl_2$ | C | 1.51 | 0.98 | | 1.37 | 3.3 | 0.333 | 288 | 72 |
| Comparison 1: | | | | | | | | | | |
| A | $CS_2$ | B | .44 | | | | Failed | 0.409 | 82 | |
| B | $CS_2$ | C | 0.19 | | | | Failed | 0.366 | 98 | |
| Comparison 2: | | | | | | | | | | |
| A | $P_2S_5$ | B | 6.93 | | 2.72 | | [1] 43.1 | 0.266 | 313 | |
| B | $P_2S_5$ | C | 6.40 | | 2.58 | | [1] 67.9 | 0.316 | 264 | |
| | None | B | | | | | Failed | 0.358 | 103 | 248 |
| | do | C | | | | | Failed | 0.399 | 78 | |

[1] Test terminated after 21 minutes because of excessive heat and noises.

As seen by Table II, blends containing 4 wt. percent of the 50/50 mixture of unsulfurized Dispersants B and C failed the Falex Wear Test, due to excessive wear, and had relatively low load carrying ability as measured by the SAE machine, and as shown by Dispersant B, gave a large increase in viscosity in the temperature stability test. Treatment with sulfur halide greatly reduced wear in the Falex machine, increased load carrying ability in the SAE machine, and increased stability to heat. Use of $CS_2$ to sulfurize the dispersants gave poor results in the Falex machine and did not improve load carrying, i.e., extreme pressure ability, as shown by the Falex machine, results. The $P_2S_5$ treatment also showed up poorly in the Falex machine. Thus, from an overall standpoint, the sulfur chloride treatment was superior to $CS_2$ and $P_2S_5$ in improving the ashless dispersant.

While the preceding illustrates the use in lubricating oil of the sulfur chloride treated ashless dispersant, it can also be used in other fluid petroleum hydrocarbons, such as gasoline, diesel fuels, heating oils, etc. For example, .001 to 1.0 wt. percent, e.g., 0.005 wt. percent of the product of Example II, Part A, can be added to gasoline or to a middle distillate home heating oil, etc.

Also, for ease in handling, oil concentrates of 10 to 80 wt. percent of the sulfurized dispersant in mineral lubricating oil can be prepared.

What is claimed is:

1. A sulfur and chlorine containing ashless dispersant comprising a polyalkyleneamine having one of its terminal primary amine groups condensed with a first acid selected from the group consisting of alkenylsuccinic anhydride, alkenylsuccinic acid, and alkenyl monocarboxylic acid, wherein said alkenyl groups contain about 40 to 250 carbon atoms; said polyalkyleneamine having its second terminal primary amine group condensed with a material selected from the group consisting of said first acid, $C_1$ to $C_{30}$ fatty acid, $C_1$ to $C_{10}$ aldehydes and ketones consisting only of carbon, hydrogen, oxygen; said polyalkyleneamine containing a total of 3 to 12 amine groups and said alkylene groups thereof each containing 2 to 3 carbon atoms; said ashless dispersant being sulfurized with sulfur chloride to a sulfur content of 0.1 to 5.0 wt. percent based on the weight of sulfurized dispersant.

2. A fluid petroleum hydrocarbon composition comprising a major amount of fluid petroleum hydrocarbon and .001 to 10.0 wt. percent of the sulfurized dispersant of claim 1.

3. A lubricating oil composition comprising a major amount of mineral lubricating oil and about .1 to 10 wt. percent of the sulfurized dispersant of claim 1.

4. A gasoline containing about .001 to 1.0 wt. percent of the sulfurized dispersant of claim 1.

5. A mineral oil concentrate consisting essentially of mineral lubricating oil and about 10 to 80 wt. percent of the sulfurized dispersant of claim 1.

6. A sulfur and chlorine containing ashless dispersant comprising the condensation product of 2 to 3 moles of polyisobutenylsuccinic anhydride with polyethyleneamine, sulfurized with sulfur chloride to a sulfur content of 0.5 to 4.0 wt. percent sulfur, wherein said polyisobutenyl groups have a molecular weight in the range of about 700 to 3,000 and wherein said polyethyleneamine contains 3 to 12 nitrogen atoms.

7. A sulfur and chlorine containing ashless dispersant comprising polyalkyleneamine having one terminal primary amine group combined with $Acid_1$ and other terminal amine groups condensed with a material represented by $R_1$, sulfurized with sulfur chloride to a sulfur content of 0.1 to 5.0 wt. percent, based on the weight of sulfurized dispersant, wherein said $Acid_1$ is selected from the group consisting of alkenylsuccinic anhydride, alkenylsuccinic acid and alkenyl monocarboxylic acid, said alkenyl groups containing about 40 to 250 carbon atoms; wherein said polyalkyleneamine is of the general formula:

$$H_2N(CH_2)_n-\{NH(CH_2)_n\}_m-NH(CH_2)_nNH_2$$

wherein $n$ is 2 to 3 and $m$ is 0 to 10; and wherein said $R_1$ is selected from the group consisting of $Acid_1$, $C_1$ to $C_{30}$ fatty acid, and aldehydes and ketones consisting only of carbon, hydrogen and oxygen and containing 1 to 10 carbon atoms.

8. A dispersant according to claim 7, wherein said alkenyl group is polyisobutenyl and said polyalkyleneamine is polyethylene amine.

References Cited

UNITED STATES PATENTS

| | | | |
|---|---|---|---|
| 1,908,773 | 5/1933 | Lutz | 260—128 |
| 2,006,756 | 7/1935 | Bartram | 44—9 |
| 2,111,306 | 3/1938 | Bartram | 252—47 X |
| 3,184,411 | 5/1965 | Lowe | 252—46.7 |
| 3,309,316 | 3/1967 | McNinch | 252—47.5 |
| 3,390,086 | 6/1968 | O'Halloran | 252—47.5 |

DANIEL E. WYMAN, Primary Examiner

W. CANNON, Assistant Examiner

U.S. Cl. X.R.

44—63, 66, 71; 260—132, 326.3, 326.5, 404.5, 561